May 27, 1969     C. E. NISKANEN     3,446,465

FLEXURE PIVOTS

Filed May 19, 1966

INVENTOR.
CLARENCE E. NISKANEN

BY Edwin D. Grant

ATTORNEY

United States Patent Office 3,446,465
Patented May 27, 1969

3,446,465
FLEXURE PIVOTS
Clarence E. Niskanen, Brigham City, Utah, assignor to Thiokol Chemical Corporation, Bristol, Pa., a corporation of Delaware
Filed May 19, 1966, Ser. No. 551,254
Int. Cl. F16m 1/00, 11/06; A47b 91/00
U.S. Cl. 248—5    4 Claims

ABSTRACT OF THE DISCLOSURE

A load supporting device wherein a pivot member is positioned in a base member and connected thereto by angularly disposed flexure rods to support and transmit heavy loads under conditions including both restrained pivotal and roll motion.

---

This invention relates to load supporting devices and more particularly to devices for pivotally supporting a load.

In many instances it is necessary to support a heavy load in a manner that permits restrained pivotal and roll motion of the load relative to the base on which it is supported. For example, in testing rocket motors it has been the practice heretofore to attach flexible members to the casing of a rocket motor, which members are known in the art as web flexures, and to connect these flexible members to load transducers by means of which the thrust of the rocket motor can be measured when it is fired. However, testing of the large rocket motors now under development cannot readily be accomplished by using conventional web flexures as support members, since devices of this type which are capable of supporting the thrust loads of large rocket motors not only are prohibitively large and expensive but also allow freedom to rotation only. Ball and socket type devices permit both roll and rotation of a load supported thereby, but in large sizes they are impractical from the standpoint of cost and weight.

Accordingly, it is a primary object of this invention to provide improved devices for pivotally supporting a load.

Another object of this invention is to provide pivots which allow both pivotal and roll motion of a load supported thereby.

An additional object of this invention is to provide pivots which are uncomplicated in design and therefore inexpensive to manufacture.

A further object of this invention is to provide pivots having a high strength to weight ratio.

Still another object of this invention is to provide pivots which are of relatively small size but which can support heavy loads.

The above and other objects are achieved by embodiments of the invention each of which comprises a pivot member, a base member at least a portion of which is disposed around said pivot member, and a plurality of flexure rods each fixedly connected at one end to said pivot member and at the other end to said base member, said flexure rods being spaced around said base member and inclined relative to the longitudinal axis thereof.

The invention is disclosed in further detail in the following description of several preferred embodiments thereof, in which reference is made to the accompanying drawings wherein.

Figure 1:
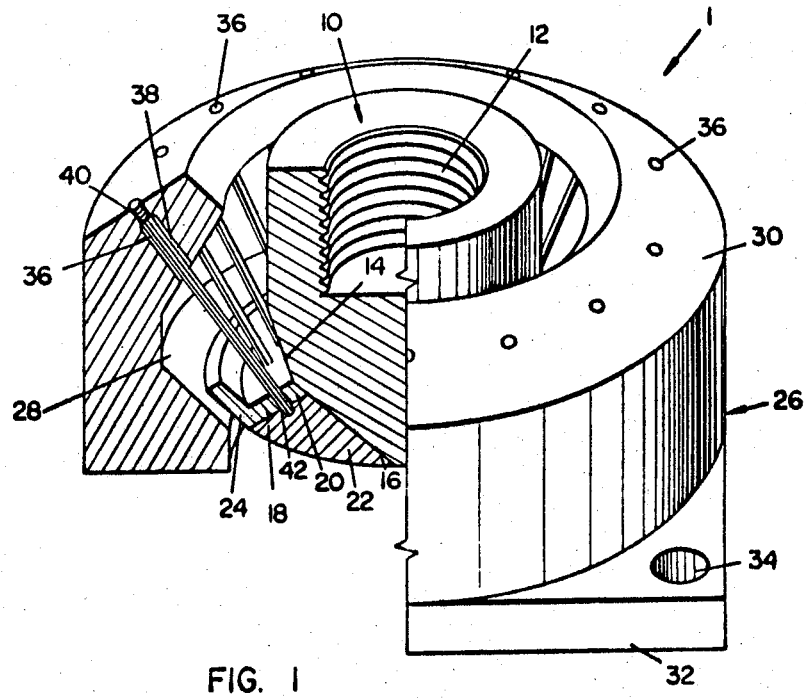
FIGURE 1 is a pictorial view illustrating a first embodiment of the invention, portions of components of the embodiment being broken away in the drawing for clarity.

In FIGURE 1 reference number 1 generally designates a first embodiment of the invention comprising a pivot member which in turn is generally designated by reference number 10 and one cylindrical end of which has a threaded hole 12 coaxially formed therein. The other end of pivot member 10 is tapered so as to provide two frustoconical surfaces 14, 16 thereon, and is formed with an outwardly projecting portion generally designated by reference number 18. More particularly, said portion 18 comprises an annular member of L-shaped cross-section, one leg 20 of said member being affixed to surface 14 by means of weld 22 and the other leg 24 thereof being disposed oblique to the longitudinal axis of pivot member 10.

Pivot member 10 is concentrically positioned within an annular base member generally designated by reference number 26. Hence, the longitudinal axis of pivot member 10 is normally coincident with the longitudinal axis of base member 26. A circumferentially extending, generally V-shaped groove 28 is formed in the inner wall of base member 26, and leg 24 of pivot member 10 projects into this groove and is disposed parallel to, and spaced from, one side thereof. One end of base member 26 is formed with a frustoconical surface 30, and the other end of said base member is provided with four integral, radially extending mounting lugs 32 (only one of which is illustrated in the drawing) through each of which extends a hole 34.

A plurality of flexure rods 36 connect pivot member 10 to base member 26, said rods being evenly spaced circumerentially of said base member and inclined relative to the longitudinal axis thereof. More specifically, one end of each rod 36 passes through a respective one of a plurality of holes 38 which extend from one side of groove 28 toward surface 30 of base member 26, and is engaged within a respective one of a plurality of threaded holes 40 each of which extends from the inner end of one of said holes 38 to said surface 30. As illustrated in the drawing, holes 38 are sufficiently large to permit flexing of flexure rods 34 therein. The other end of each flexure rod 36 passes through a respective one of a plurality of holes 42 formed in portion 18 of pivot member 10 (and more specifically, in leg 20 thereof) and is fixedly secured therein by weld 22. All of the above described components are made of high-strength steel.

Figure 2:
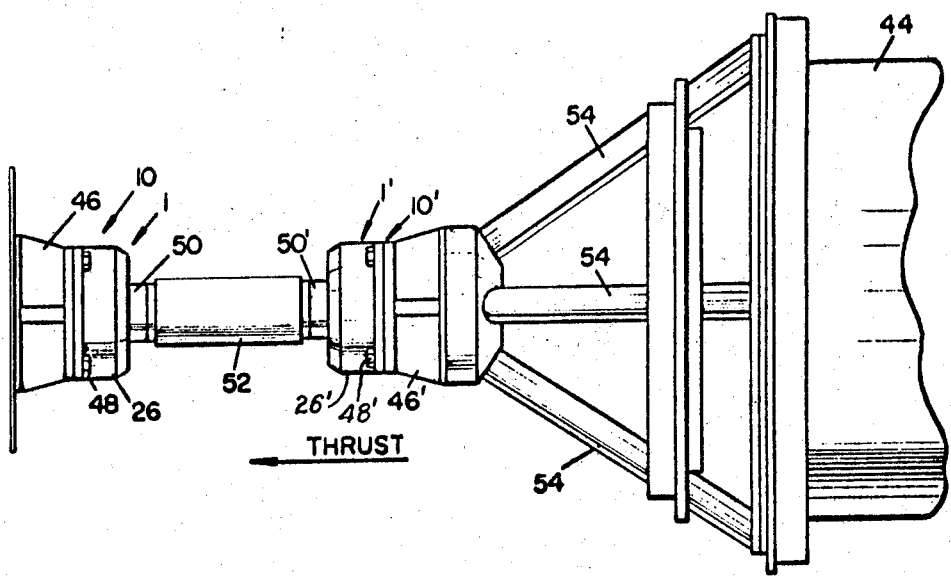
FIGURE 2 is a view illustrating the use of the first embodiment in a rocket motor thrust test assembly.

One advantageous use of the aforedescribed embodiment of the invention is illustrated in FIGURE 2, wherein two pivots 1, 1' are employed in a thrust test assembly for a rocket motor 44. More particularly, base member 26 of pivot 1 is secured to an immovable base 46 by means of bolts 48, and one end of the support portion or shaft 50 of a load tranducer 52 is threadedly engaged within hole 12 of the pivot member 10 of said pivot 1. The support shaft 50' at the other end of transducer 52 is threadedly engaged within hole 12 of the pivot member 10' of pivot 1', the base member 46' of said pivot 1' being connected to the forward end of rocket motor 44 by means of support bars 54. Rocket motor 44 is also supported by other members (not shown) that permit both pivotal and roll motion of the rocket motor relative to the longitudinal axis of base 46. When the rocket motor is fired, the pivot members 10 and 10' of pivots 1, 1' will pivot and roll relative to base 46 and base 46'. These movements are permitted by the disclosed embodiment of the invention since flexure rods 36 can bend in any direction relative to base member 26. Pivot members 10 pivot about the point of intersection of the longitudinal axes of flexure rods 36 of the pivot 1, 1' respectively.

A particularly advantageous design feature of the flexure pivot illustrated in FIGURE 1 is that provided by the arrangement of portion 18 of pivot member 10 and groove 28 of base member 26 thereof. As indicated hereinbefore, leg 24 of said portion 18 projects into groove 28. Consequently, if flexure rods 36 should fail under an excessive load, leg 24 will seat against the adjacent side of groove 28 and thus prevent further axial movement of the load applied to the flexure pivot.

Figure 3:
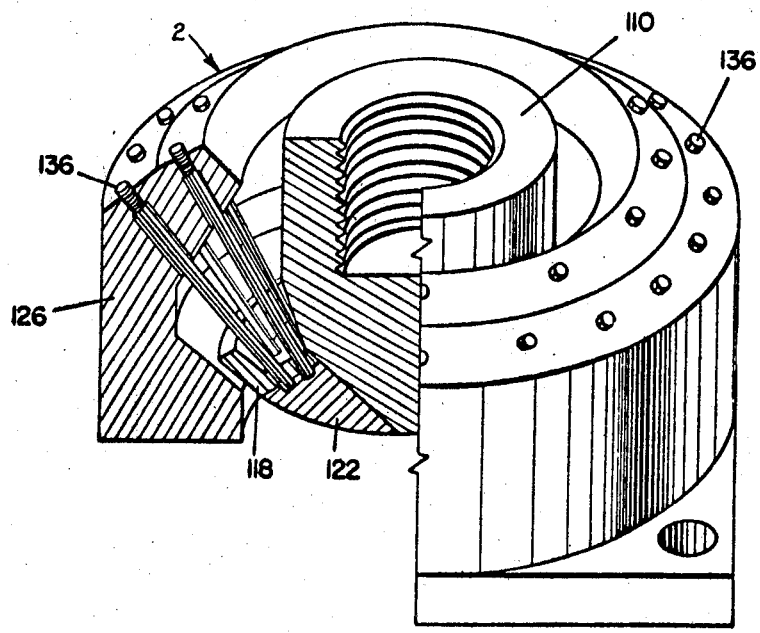
FIGURE 3 is a pictorial view illustrating a second embodiment of the invention, portions of components of the embodiment being broken away in the drawing for clarity.

In FIGURE 3 is illustrated a pivot, generally designated by reference number 2, that is substantially identical to the above-described first embodiment except that there are two rows of flexure rods 136 incorporated in the second embodiment. Therefore, like components of the two embodiments are designated by reference numbers differing by 100. The flexure rods 136 have the same diameter as flexure rods 36, and the number of flexure rods in the second embodiment is twice the number of flexure rods in the first embodiment. Consequently, the thrust load capacity of the second embodiment is greater than that of the first embodiment, whereas pivotal and roll motion of its pivot member 110 relative to its base member 126 requires the application of forces approximately double the forces that would be required to effect the same degree of motion in the case of the first embodiment. However, if the flexure rods 36 of the first described embodiment were doubled in size (i.e., the cross-sectional area of each rod 36 doubled), the force required to pivot pivot member 10 would be almost three times as great for a given degree of motion. Hence the arrangement of the flexure rods 136 in two rows as in the second embodiment (said flexure rods 136 being of the said diameter as flexure rods 36 of the first embodiment but double their number) is preferable to doubling the cross-sectional area of flexure rods 36 to increase the thrust load capacity of the first embodiment, since the latter arrangement would place a greater limitation upon the freedom of movement of the pivot member 10 than there is upon pivot member 110.

Figure 4:
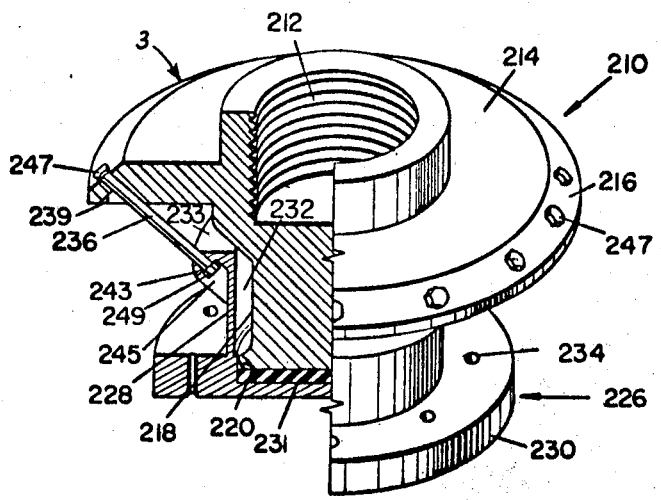
FIGURE 4 is a pictorial view illustrating a third embodiment of the invention, portions of components of the embodiment being broken away in the drawing for clarity.
Figure 5:
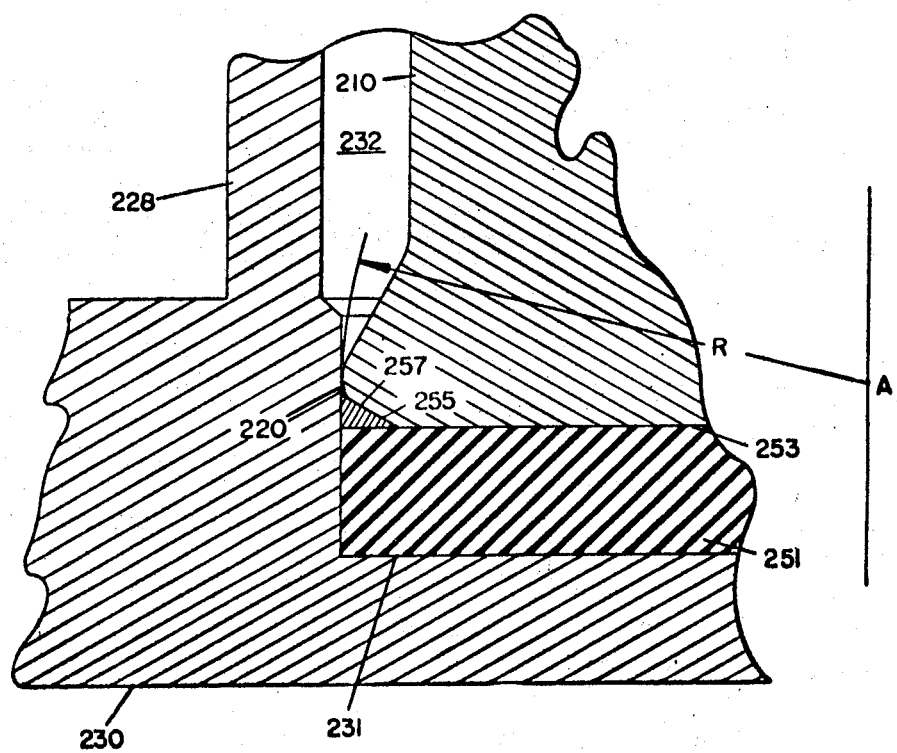
FIGURE 5 is a fragmentary, sectional view of certain components of the third embodiment, illustrating details of the construction thereof.

In FIGURES 4 and 5 is illustrated a third pivot (generally designated by reference number 3) which comprises a pivot member (generally designated by reference number 210) one cylindrical end of which has a threaded hole 212 coaxially formed therein. Extending radially from the same end of pivot member 210 is a flange 214 having a peripheral surface 216 which is inclined relative to the longitudinal axis of said pivot member. Pivot member 210 has a middle portion 218 of reduced diameter and the side of the other end thereof is formed with a sperical surface 220 (i.e., as illustrated in FIGURE 5, all points on said surface 220 are a distance R from a point A located on the longitudinal axis of said pivot member).

The third embodiment of the invention also comprises a base member (generally designated by reference number 226) having a cylindrical portion 228 integrally joined with, and disposed perpendicular to, a base portion 230. Formed in base portion 230 of base member 226 is a cylindrical hole 231 (the cylindrical passage 232 through portion 228 of base member 226 and said hole 231 may be considered together as a single hole formed in said base member). A radially projecting flange 233 is integrally joined to the free end of portion 228 of base member 226, and a number of holes 234 are spaced around said base portion 230 thereof. The spherical surface 220 of pivot member 210 slidably abuts the wall of hole 231.

A plurality of flexure rods 236 connect pivot member 210 to base member 226, said rods being evenly spaced circumferentially of said base member and inclined relative to the longitudinal axis thereof. More specifically, one end of each rod 236 passes through a respective one of a plurality of holes 238 each of which extends from surface 216 to a recess 239 formed in flange 214 of pivot member 210. The other end of each rod passes through a respective one of a plurality of holes 241 each of which extends from outer surface 243 of flange 233 of base member 226 to a recess 245 formed in said flange. Each flexure rod 236 is provided with a head 247 and has a nut 249 threadedly engaged with the other end thereof.

Seated in hole 231 is a disk-shaped pad 251 the edge of which abuts the wall of said hole. As can best be seen in FIGURE 5, the end surface 253 of pivot member 210 is seated against the outer surface of pad 251, and a retaining ring 255 is disposed against the wall of hole 231 between said pad and pivot member. More particularly, retaining ring 255 has an inwardly inclined outer surface (i.e., the outer surface of retaining ring 255 slopes toward the bottom of hole 231 as illustrated in FIGURE 5), and pivot member 210 has a circumferentially extending peripheral (under) surface 257 that matingly abuts said outer surface of said ring and a vertically extending spherical surface 220 contacting the wall of hole 231 therein.

Pad 251 is made of a resilient polymeric material and thus the pad acts like an incompressible fluid. Retaining ring 255 is made of a material having a hardness greater than that of the material of which pad is made. For example, retaining ring can advantageously be made of a soft metal such as brass. All other components of the described third embodiment of the invention are made of high-strength steel.

It will be understood from the foregoing description that pivot member 210 can be connected to a load by means of a shaft (not shown) threadedly engaged within hole 212 thereof, and that base member 226 can be mounted on an immovable base (not shown). Thereafter, force can be applied upon pivot member 210 to cause it to pivot and roll with respect to base member 226, since flexure rods 236 can bend in any direction. It will also be recognized that the nuts 249 on flexure rods 236 can be turned to thereby vary the force on pad 251 between pivot member 210 and base member 226. Thus pivotal motion of pivot member 210 relative to base member 226 is restrained not only by flexure rods 236 (the stiffness of which can conveniently be varied by changing the diameter thereof) but also by pad 251, since the pad must be displaced when the longitudinal axis of pivot member 210 is tilted in any direction away from the longitudinal axis of base member 226. The spherical surface 220 on pivot member 210 remains in contact with the wall of hole 231 when said pivot member pivots relative to base member 226, and thus tends to prevent the edge portion of pad 251 from squeezing out of the space between said pivot member and base member as a result of the compression forces applied thereon. However, as an added precaution against this contingency, retaining ring 255 is placed between the edge portion of pivot member 210 and pad 251.

Each of the three embodiments of the invention which have been described and illustrated provides a pivot which can readily be manufactured and which, for a given size, is capable of pivotally supporting relatively large loads. Furthermore, each embodiment permits limited pivotal and roll motion of a load supported thereby. It will thus be seen that the objects set forth above are efficiently attained by means of the invention. Since certain changes can be made in the disclosed pivots without departing from the scope of the invention as defined in the appended claims, it is intended that all matter contained in the above description or shown in the accompanying drawings shall be interpreted as illustrative and not in a limiting sense.

What is claimed is:
1. A pivot for pivotally supporting very heavy loads comprising a pivot member having a connecting means in one end of said pivot member, a base member surrounding and adjacent to the other end of said pivot mem- ber, means on said base member for connecting said pivot to said load, and a plurality of flexure rods each fixedly connected at one end to said pivot member and at the other end to said base member, said flexure member being spaced at their ends on a periphery of said respective pivot and base members and inclined relative to the longitudinal axis thereof.

2. A pivot as defined in claim 1 wherein said base member where it surrounds said pivot member end has a circumferentially extending groove formed in the inner wall thereof, and wherein said pivot member includes a circumferentially extending portion that projects into said groove and is spaced from the wall thereof.

3. A pivot as defined in claim 1 wherein said base member has a cylindrical hole formed therein and including a resilient, disk-shaped pad seated in said hole, the other end of said pivot member being seated against said pad and the side wall thereof being formed with a spherical surface that slidably abuts the wall of said hole and remains in contact therewith when said pivot member pivots relative to said base member.

4. A pivot as defined in claim 3 including a retaining ring disposed against the side wall of said hole between said pad and pivot member, said retaining ring having an inwardly inclined outer surface and a hardness greater than that of said pad, said pivot member having a circumferentially extending peripheral surface that matingly abuts the outer surface of said ring.

References Cited

UNITED STATES PATENTS

| | | | |
|---|---|---|---|
| 1,890,696 | 12/1932 | Rosenhahn | 248—160 XR |
| 3,086,600 | 4/1963 | Kerley | 248—350 XR |
| 3,240,454 | 3/1966 | Ormond | 248—5 |
| 3,268,193 | 8/1966 | Oliveau | 248—158 |

JOHN PETO, *Primary Examiner.*

U.S. Cl. X.R.

248—350